United States Patent [19]

Sankey

[11] 4,098,139
[45] Jul. 4, 1978

[54] GEAR TRAIN AND METHOD OF ALIGNING COMPONENT GEARS THEREOF

[75] Inventor: Edwin W. Sankey, Marion, Ohio

[73] Assignee: Marion Power Shovel Company, Inc., Marion, Ohio

[21] Appl. No.: 750,723

[22] Filed: Dec. 15, 1976

[51] Int. Cl.² ............................................ F16H 57/00
[52] U.S. Cl. ............................................... 74/410
[58] Field of Search ................................... 74/410, 411

[56] References Cited

U.S. PATENT DOCUMENTS

| | | | |
|---|---|---|---|
| 3,548,678 | 12/1970 | Phillips | 74/410 X |
| 3,587,338 | 6/1971 | Henriot | 74/410 |
| 3,760,654 | 9/1973 | Fisher | 74/410 X |
| 3,807,250 | 4/1974 | Dietzel et al. | 74/410 |
| 3,905,250 | 9/1975 | Sigg | 74/410 X |

*Primary Examiner*—Leonard H. Gerin
*Attorney, Agent, or Firm*—Mason, Fenwick & Lawrence

[57] ABSTRACT

A method of assembling a gear train including at least two shafts each journaled in at least one gear and bearing, in a support assembly, comprising forming openings in the support assembly having cross sectional areas greater than the cross sectional areas of the bearings, positioning the bearings in the openings, meshing the gears to provide a desired clearance and alignment of the shafts, inserting a moldable, hardenable material in the openings between the support assembly and the bearings and then hardening the material to fix the position of the bearings and, correspondingly, assure the desired clearance of the gears and alignment of the shafts without requiring accurate machining of the openings in the support assembly.

5 Claims, 5 Drawing Figures

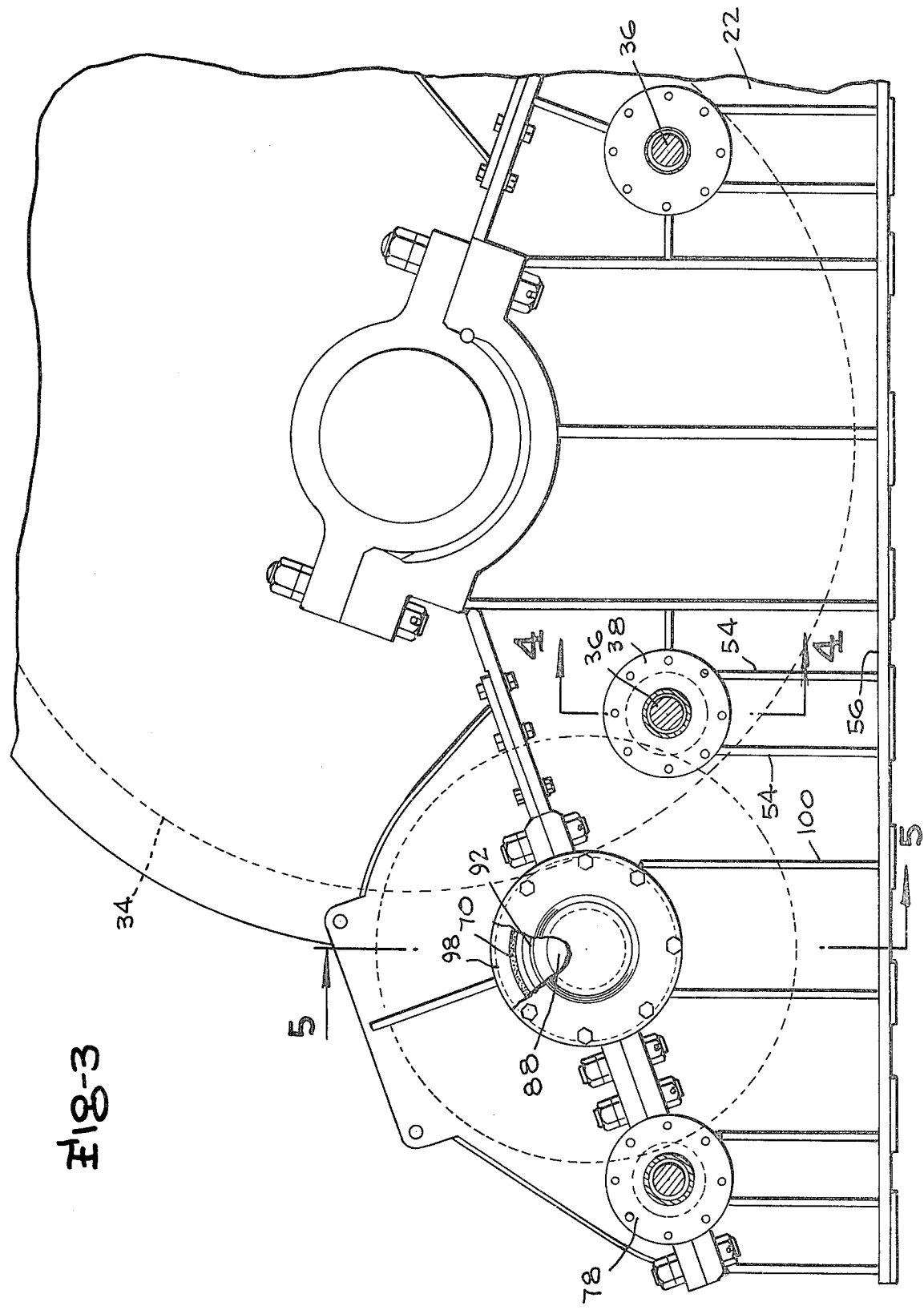

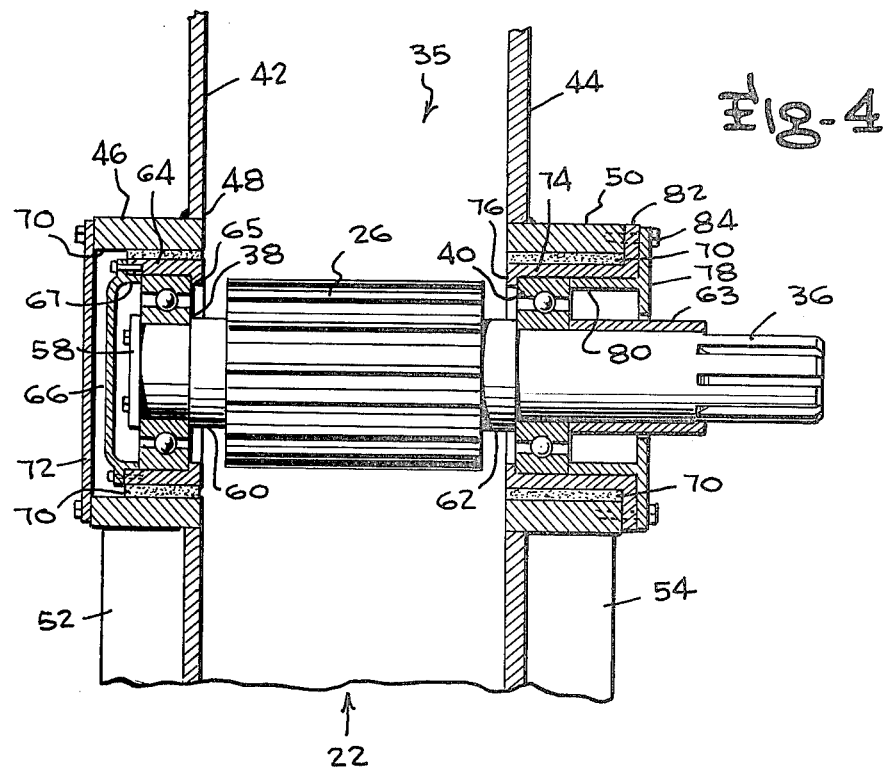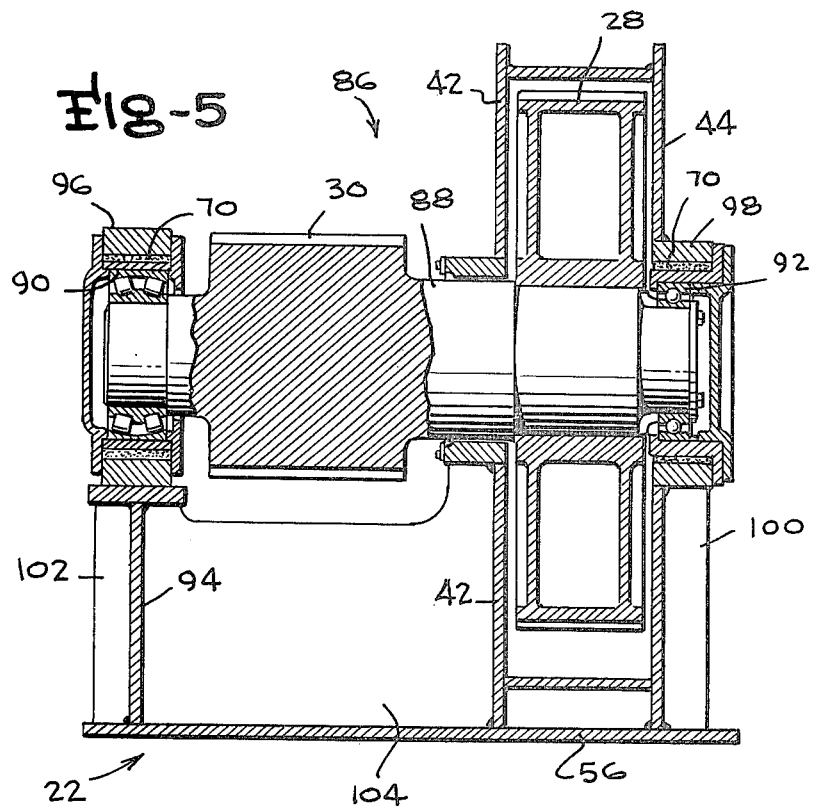

GEAR TRAIN AND METHOD OF ALIGNING COMPONENT GEARS THEREOF

In the prior art, the alignment of the gears in gear trains has been accomplished by accurately positioning and machining the openings which receive the gear shaft bearings. Maintaining the necessary accuracy in producing gear trains having small dimensions is not particularly difficult; however, it is much more difficult in gear trains for heavy earth moving equipment such as large walking draglines which have gear cases over 25 feet long and 8 feet square. To accurately position a multiplicity of bearing bores and gear centers in gear cases of this size requires very accurate machining to achieve the desired alignment of the gears.

For many reasons, the necessary accuracy is very difficult to achieve in these massive cases. Residual stresses exist in the welded portions of these cases and these stresses are relieved when metal is removed during machining thereby causing the gear case to be deflected which in turn misaligns the bearings. A horizontal boring mill is usually required to machine the bearing bores which requires indexing the casing with respect to a bore bar over distances of as much as 24 feet. Inaccuracies in the guideways of the machine tools, wear of the components in the boring mills and running clearances in the various elements of the boring mills are a significant source of inaccuracy in the positioning of the bearing bores. Other sources of inaccuracy include wear of the boring tools, the presence of human error, and the deflections within the machine tool over the long distances required for these large gear cases. Because of the presence of these inaccuracies, the production of large gear trains has been difficult and expensive and has resulted in extensive rework due to misalignment of gears in the field.

There has thus been a continuing need to provide a method and apparatus which simply and economically provides an accurately aligned gear train. This need is particularly applicable to the extremely large gear trains found in heavy earth moving equipment.

Accordingly, it is the principle object of this invention to provide a novel method and apparatus for producing a gear train with accurately aligned gears.

Another object of the present invention is to provide a gear train which may be aligned within a desired accuracy after machining has been performed with relatively inaccurate and inexpensive machine tools.

A further object of the present invention is to provide a method for producing gear trains which does not require accurately positioned bearing bores to achieve the desired accuracy of alignment of gears in the gear train.

An additional object of the present invention is to provide a gear train which can be assembled in an inexpensive gear case to achieve the desired alignment of gears within the gear train.

A still further object of the present invention is to provide a method for assembling gear trains which eliminates the necessity of accurately machining bearing bores in a gear case to receive bearings for the gear shafts of the gear train.

A further object of the present invention is to provide a method for producing a desired alignment of gears in a gear assembly wherein the gears may be aligned to the desired accuracy in the field rather than at the factory.

Other objects and advantages of the invention will become more apparent to those persons having ordinary skill in the art to which the invention pertains, from the following description, taken in conjunction with the accompanying drawings wherein:

FIG. 3 is an enlarged fragmentary cross-sectional view taken along lines 3—3 in FIG. 2;

FIG. 4 is an enlarged fragmentary cross-sectional view taken along lines 4—4 in FIG. 3 showing a gear assembly according to the present invention; and FIG. 5 is an enlarged cross-sectional view taken along lines 5—5 in FIG. 3.

Figure 1:
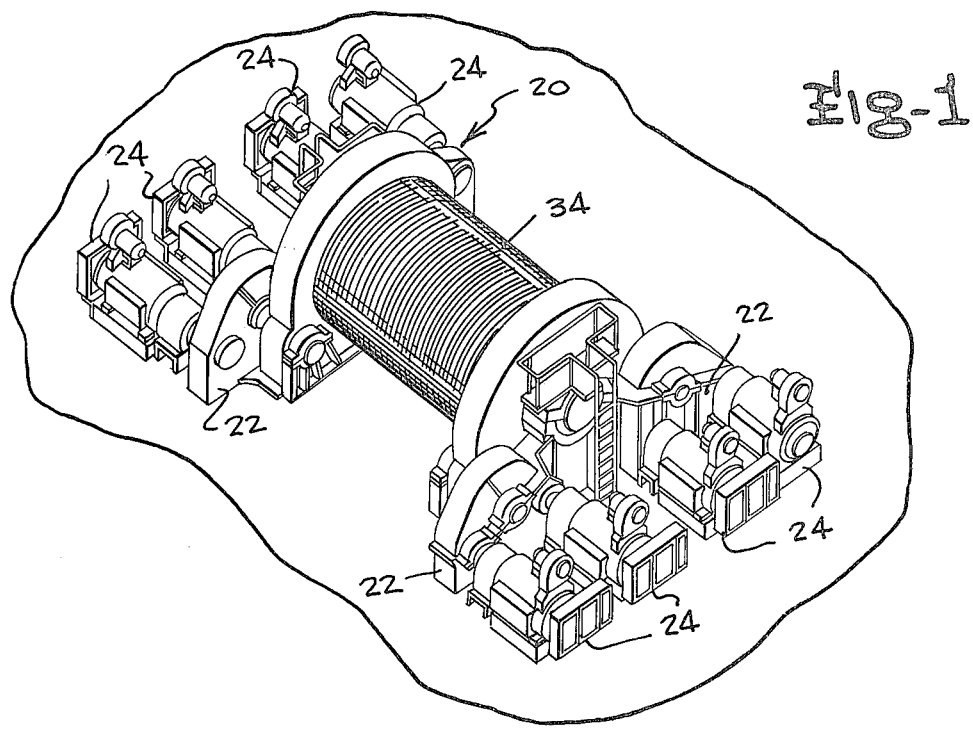
FIG. 1 is a perspective view of a hoist machinery assembly for a large walking dragline embodying the invention.
Figure 2:
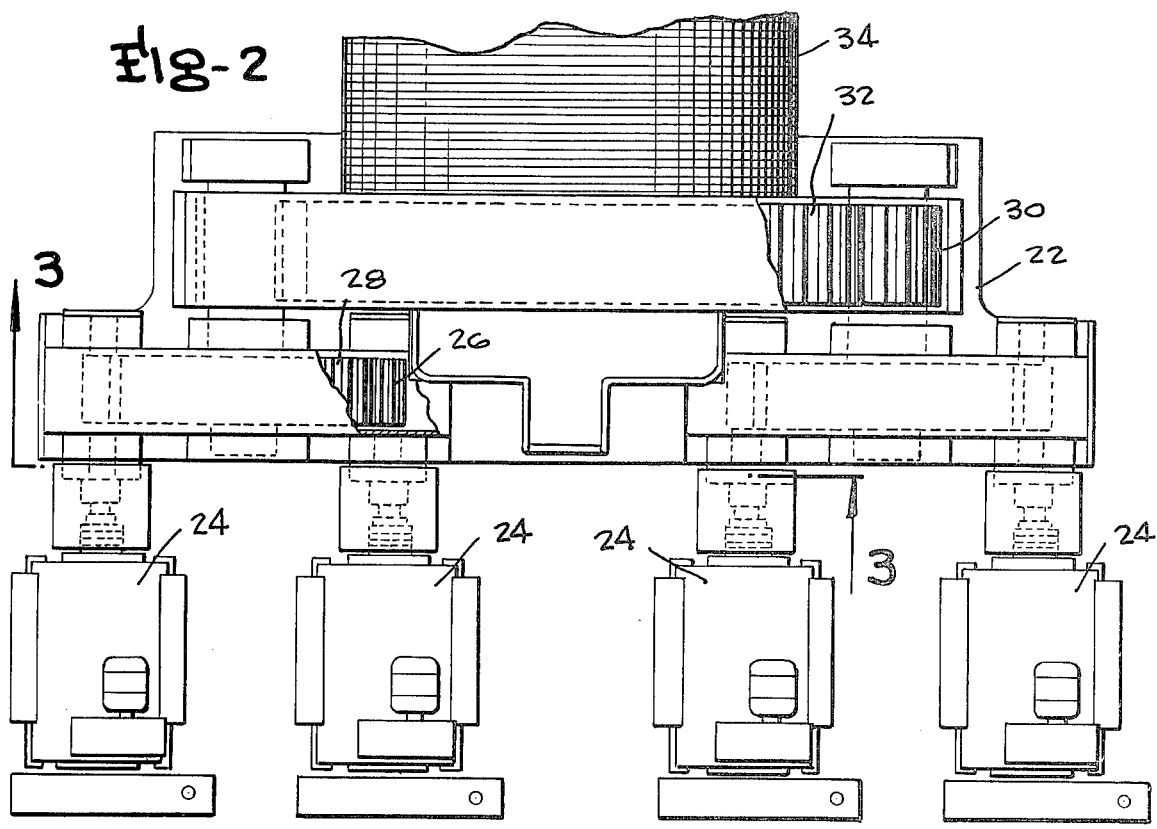
FIG. 2 is a fragmentary top plan view of one end of the hoist machinery assembly illustrated in FIG. 1.

An assembly according to the present invention, generally designated by the numeral 20 in FIGS. 1 and 2, includes a set of gear cases 22, hoist drive motors 24 coupled to motor pinions 26, driven gears 28 which engage the motor pinions 26 and are fixed to the shafts of drive pinion gears 30 which engage bull gears 32 fixed to the ends of a hoist drum 34 journaled in the gear cases 22. Power is delivered to hoist drum 34 from drive motors 24 through motor pinions 26 to the driven gears 28 which in turn rotate drive pinions 30 to drive the bull gears 32 thereby permitting the use of from one to eight drive motors as shown in FIG. 1 to power the hoist drum 34. A gear case of the type desired for use in a dragline machine is formed by welding thick steel plates and cylinders together to provide the desired configuration. The gear cases 22 may be over 25 feet in length which necessitates the fabrication of the housing from steel plates and cylinders due to the prohibitive cost of producing castings of this size.

As best illustrated in FIGS. 2 and 4, the drive motors 24, which are under the control of the hoist operator, drive the driven gears 28 through a motor gear pinion assembly 35 including a splined motor extension shaft 36 journaled in a motor pinion rear bearing 38 and a motor pinion front bearing 40.

Referring particularly to FIGS. 3 and 4, the gear case 22, which protects the various gear train elements and provides support structure for the various bearings of the gear train, includes an intermediate wall 42 and a front wall 44 with a cylindrical rear bearing support 46 welded to the intermediate wall 42 by a weld 48 as shown in FIG. 4. Support for the motor pinion front bearing 40 is provided by a cylindrical front bearing support 50 which is similarly welded to the front wall 44. The front and rear bearing supports 50 and 46 are supported by brace plates 52 and 54 which extend between the bearing supports 46 and 50 and a base plate 56, indicated in FIG. 3, to provide the gear case 22 with adequate strength and limited deflection.

As illustrated in FIG. 4, the rear bearing 38 is retained on the motor extension shaft 36 by an end plate 58 bolted to the shaft 36 and by a rear shoulder 60 on the shaft. It can be seen that the front bearing 40 is similarly retained in a position by a front shoulder 62 on the shaft, and a sleeve 63 fixed to the shaft by suitable means as shown in FIG. 4. The outer race of the rear bearing 38 is mounted in a rear bearing boss 64 having an inwardly projecting flange 65 which engages the outer race of the rear bearing. A cover plate 66, bolted around its periphery to the rear bearing boss 64, has an axially projecting circumferential lip 67 which extends inside the rear bearing boss 64 to press the outer race of the rear bearing 38 against the flange lip 65. The outside diameter of the rear bearing boss 64 is smaller than the inside diameter of the cylindrical rear bearing support 46 leaving a space therebetween to be filled with a moldable, hardenable material 70 such as an epoxy resin. After the motor pinion 32 is positioned in the desired alignment with a driven gear 30 as shown in FIG. 2, the moldable, hardenable material 70 is inserted into the space between the boss 64 and the support 46 by a method to be described hereafter. After the moldable, hardenable material has been hardened, such as by curing in the case of epoxy resin, the motor pinion 32 will be permanently positioned in the desired alignment. A protective plate 72 is bolted over the rear opening in the cylindrical rear bearing support to protect the rear bearing 38.

It further will be noted that the front bearing 40 is mounted in a front bearing boss 74 having an inwardly projecting flange lip 76 which seats against the outer race of the front bearing 40. The outside diameter of the front bearing boss 74 is smaller than the inside diameter of the front bearing support 50 to create a space therebetween. A front protective cover 78 has a central opening through which the shaft 36 extends and has an axially projecting cylindrical lip 80 which contacts the outer race of the front bearing and presses it against the flange lip 76 on the front bearing boss 74. The front bearing boss 74 is retained axially by a radial projecting flange 82 positioned between the front bearing support 50 and the front protective cover 78. Bolts 84 pass through clearance holes in the cover 78 and boss 74 and threadingly engage the front bearing support 50 to retain the boss and cover in the desired position. The moldable, hardenable material 70, by the method to be described hereafter, fills the space between the front bearing boss 74 and the front bearing support 50 and positions the motor pinion 32 in the desired alignment when the material 70 is hardened.

As best illusbrated in FIG. 5, an intermediate gear assembly 86 includes the pinion gear 28 and the driven gear 30 mounted on an intermediate gear shaft 88 with the shaft being journaled in an intermediate rear bearing 90 and an intermediate front bearing 92. The structure of the case 22 at this location includes the front wall 44, the intermediate wall 42, and a rear wall 94. A cylindrical rear bearing support 96 similar to bearing support 46 in FIG. 4 provides support for the intermediate rear bearing 90 while support for the intermediate front bearing 92 is provided by a cylindrical front bearing support 98. Front and rear brace plates 100 and 102 provide support between the base plate 56 and the front and rear cylindrical bearing supports 98 and 96. Extending between the rear wall 94 and the intermediate wall 42 is a reinforcing plate 104 to provide rigidity and strength. The means for mounting and retaining the front and rear bearings 92 and 90 on the shaft and within the cases 22 are similar to those described for the motor gear pinion assembly 35 as shown in FIG. 4. When the pinion 30 and driven gear 28 are positioned in the desired alignment, the moldable, hardenable material 70 is hardened to permanently position the gears in the desired alignment.

The method for producing the desired alignment of the motor pinion gear 26 in the motor gear pinion assembly 35 is accomplished by first positioning the rear bearing boss 64 on the outer race of the rear bearing 38 and seating the rear bearing 38 against the rear shoulder 60 on the motor extension shaft 36. End plate 58 then may be bolted against the inner race of the rear bearing 38 with cover plate 66 bolted to the rear bearing boss 64 to lock the boss on the outer race of the bearing. The front bearing boss 74 is mounted with flange lip 76 pressing against the outer race of the front bearing 40 and is locked in position by pressing front protective cover 78 against the flange 82 of the front bearing boss 74. The front bearing is then pressed against the front shoulder 62 on the extension shaft 36 and locked in position by sleeve 63. The assembled shaft and bearings are then inserted through the cylindrical openings in the front and rear bearing supports and positioned in the desired alignment by suitable temporary support means such as vee blocks or fixtures. The space between the front bearing support 50 and the front bearing boss 74 and the space between the rear bearing support 46 and the rear bearing boss 64 are filled with a moldable, hardenable material 70 such as epoxy resin. It will be appreciated that the insertion of the moldable, hardenable material may be accomplished through suitable openings with suitable retaining means to prevent the material from escaping from the desired spaces. Suitable temporary seals may be utilized to keep the moldable, hardenable material in the space between the support and the bearing. The material is then hardened, such as by curing at an elevated temperature in the case of epoxy resin, to permanently position the gears in the desired alignment. The temporary support means may then be removed. As can be appreciated, this method permits precision alignment of the gears without requiring accurate machining of the inside diameters of the front and rear bearings supports 50 and 46 since only a clearance space is necessary. Intermediate gear assembly 86 is similarly assembled and permanently positioned by the same method.

It will be appreciated that a significant advantage of the present invention is the ability to delay the alignment and permanent positioning of the gears in the gear train until after assembly at the site thereby avoiding the necessity of assembling the entire system at the factory. Accurate alignment of the gears, therefor, may be achieved at a reduced cost.

From the foregoing detailed description, it will be evident that there are a number of changes, adaptions and modifications of the present invention which come within the province of those skilled in the art. For example, the apparatus as described can be modified for use in the positioning gears of all sizes as the method is obviously not limited to gear trains of large dimension. It is intended that all such variations not departing from the spirit of the invention be considered as within the scope thereof and as limited solely by the appended claims.

I claim:

1. A method of assembling a gear train including at least two shafts each journaled in at least one gear and bearing, in a support assembly, comprising forming openings in said support assembly having cross sectional areas greater than the cross sectional areas of said bearings, positioning said bearings in said openings, meshing said gears to provide a desired clearance and aligning said shafts, inserting a moldable, hardenable material in said openings between said support assembly and said bearings and hardening said material to fix the position of said bearings and, correspondingly, assure the desired clearance of said gears and alignment of said shafts without requiring accurate machining of the openings in the support assembly.

2. The method of claim 1 wherein said moldable, hardenable material is epoxy resin and wherein said hardening is accomplished by curing said epoxy resin.

3. A gear assembly having a desired alignment of gears in a gear train, said gear assembly comprising a support structure having openings at predetermined locations, bearings positionable in said opening with said opening having cross sectional areas smaller than the cross sectional areas of said openings when a bearing is positioned in an opening, at least two shafts each journaled in said bearings, at least one gear journaled on each of said shafts, said shafts positioned to provide the desired clearance of said gears and alignment of said shafts, and a moldable, hardenable material filling at least a portion of the openings between said support assembly and said bearings, thereby providing a gear assembly in which the shafts may be positioned in the desired alignment without requiring accurate machining of the openings in the support structure.

4. The gear assembly of claim 3 wherein the moldable, hardenable material has been hardened to fix the position of the bearings.

5. The gear assembly of claim 4 wherein said moldable, hardenable material is epoxy resin and wherein said hardening is accomplished by curing said epoxy resin.

* * * * *